(12) United States Patent
Ashby, Jr. et al.

(10) Patent No.: US 9,875,169 B2
(45) Date of Patent: Jan. 23, 2018

(54) MODELING REAL CAPACITY CONSUMPTION CHANGES USING PROCESS-LEVEL DATA

(71) Applicants: John Wiley Ashby, Jr., Austin, TX (US); Balaji Varadaraju, Austin, TX (US)

(72) Inventors: John Wiley Ashby, Jr., Austin, TX (US); Balaji Varadaraju, Austin, TX (US)

(73) Assignee: CA, Inc., New York, NY (US)

(*) Notice: Subject to any disclaimer, the term of this patent is extended or adjusted under 35 U.S.C. 154(b) by 78 days.

(21) Appl. No.: 14/669,817

(22) Filed: Mar. 26, 2015

(65) Prior Publication Data

US 2016/0283271 A1 Sep. 29, 2016

(51) Int. Cl.
*G06F 11/34* (2006.01)
*G06Q 10/06* (2012.01)
*G06F 9/50* (2006.01)

(52) U.S. Cl.
CPC ........ *G06F 11/3442* (2013.01); *G06F 9/5072* (2013.01); *G06Q 10/06* (2013.01); *G06F 9/505* (2013.01); *G06F 9/5077* (2013.01); *G06F 11/3452* (2013.01); *G06F 2209/5019* (2013.01)

(58) Field of Classification Search
CPC .... G06F 9/505; G06F 9/5077; G06F 11/3452; G06F 11/3442; G06F 2209/5019; G06F 9/5072
See application file for complete search history.

(56) References Cited

U.S. PATENT DOCUMENTS

| | | | | |
|---|---|---|---|---|
| 7,665,090 B1* | 2/2010 | Tormasov | ............. | G06F 9/4881 718/104 |
| 8,856,797 B1* | 10/2014 | Siddiqui | ................... | G06F 9/46 718/104 |
| 2008/0005736 A1* | 1/2008 | Apacible | ............... | G06F 9/4843 718/100 |
| 2008/0059972 A1* | 3/2008 | Ding | ....................... | G06F 9/505 718/105 |
| 2012/0204176 A1* | 8/2012 | Tian | ........................ | G06F 9/505 718/1 |
| 2013/0080760 A1* | 3/2013 | Li | ........................ | G06F 11/3409 713/100 |
| 2014/0019964 A1* | 1/2014 | Neuse | ................. | G06F 9/45533 718/1 |

* cited by examiner

*Primary Examiner* — Lewis A Bullock, Jr.
*Assistant Examiner* — Jacob Dascomb
(74) *Attorney, Agent, or Firm* — Baker Botts L.L.P.

(57) ABSTRACT

A method includes receiving an expected growth rate for modeling future capacity utilization for a resource hosting a plurality of processes, each process being associated with a respective workload. The method also includes modifying, in a non-linear capacity utilization model for the resource, the respective workload for a particular process in the plurality of processes based on the expected growth rate, and, in response to modifying the respective workload, determining a change in total capacity utilization for the resource using the non-linear capacity utilization model. The method further includes determining a ratio between the change in the total capacity utilization for the resource and the modification to the respective workload. The method additionally includes modifying, based on the ratio, a configuration of the resource with respect to the particular process in anticipation of the expected growth rate.

20 Claims, 16 Drawing Sheets

AUTOMATED CAPACITY MODEL OPPORTUNITIES/EXAMPLES

- RESOURCE SCORING
  - PROJECTIONS/RESULTS ARE LINEAR SO SIMULATIONS ARE NOT BOUND TO A SPECIFIC TOOL.

| SCENARIO | CURRENT STATE | +10% | +15% | +20% | +25% | +30% | +35% | +40% | +45% | +50% | +55% | +60% | +65% | +70% | +75% | +80% | +85% | +90% | +95% | +100% |
|---|---|---|---|---|---|---|---|---|---|---|---|---|---|---|---|---|---|---|---|---|
| LINEAR CPU PROJECTION | 43.63 | 47.99 | 50.17 | 52.36 | 54.54 | 56.72 | 58.9 | 61.08 | 63.26 | 65.45 | 67.63 | 69.81 | 71.99 | 74.17 | 76.35 | 78.53 | 80.72 | 82.9 | 85.08 | 87.26 |
| CA CAPACITY MODEL PROJECTION | 55.7 | 60.57 | 63.33 | 66.08 | 68.83 | 71.59 | 74.34 | 77.09 | 79.85 | 82.6 | 85.35 | 88.11 | 90.86 | 93.61 | 96.37 | 89.12 | | | | |

- CURRENT STATE (CAPACITY) – 55.7%

- 55.07 X 1.50 = 82.605%

- 55.07 X 1.75 = 96.3725%

CPU CAPACITY = RESCORE VALUE

FIG. 5

AUTOMATED MODELING FEATURES

| SERVICE PROFILE SUMMARY - MONTHLY | | | | | | | | 2014-10-08 17:38 - 2014-11-07 17:38 UTC |
|---|---|---|---|---|---|---|---|---|
| SERVICE | TOTAL SERVERS | HEADROOM RISK | TRENDING RISK | WASTED RESOURCES | | | | |
| BANKING | 25 | 0 | 0 | 34 | SERVICE PROFILE | SERVICE OPTIMIZATION | SERVICE FORECAST | |
| CORPORATE | 72 | 9 | 15 | 93 | SERVICE PROFILE | SERVICE OPTIMIZATION | SERVICE FORECAST | |
| ENERTAINMENT | 4 | 0 | 0 | 6 | SERVICE PROFILE | SERVICE OPTIMIZATION | SERVICE FORECAST | |
| FORWARDINC.COM | 23 | 2 | 6 | 9 | SERVICE PROFILE | SERVICE OPTIMIZATION | SERVICE FORECAST | |
| INSURANCE | 26 | 1 | 1 | 38 | SERVICE PROFILE | SERVICE OPTIMIZATION | SERVICE FORECAST | |
| MANAGED SERVICES | 24 | 5 | 7 | 7 | SERVICE PROFILE | SERVICE OPTIMIZATION | SERVICE FORECAST | |
| ONLINE TRADING | 19 | 5 | 7 | 4 | SERVICE PROFILE | SERVICE OPTIMIZATION | SERVICE FORECAST | |
| RETAIL | 48 | 4 | 8 | 59 | SERVICE PROFILE | SERVICE OPTIMIZATION | SERVICE FORECAST | |
| SAP | 24 | 5 | 13 | 23 | SERVICE PROFILE | SERVICE OPTIMIZATION | SERVICE FORECAST | |
| | | | | 1 OF 1 | | | MAX PER PAGE | 10 |

FIG. 9

| ⊠ SERVICE OPTIMIZATION - CORPORATE | 2014-10-08 17:17 - 2014-11-07 17:17 UTC |
|---|---|
| CLUSTER PARAMETER | VALUE |
| VMs REQUIRING OPTIMIZATION (TOTAL COUNT) | 24 VMs |
| VMs REQUIRING vCPU CONFIG CHANGE | 15 VMs |
| VMs REQUIRING vRAM CONFIG CHANGE | 13 VMs |
| VMs REQUIRING STORAGE OPTIMIZATION | 4 VMs |
| POTENTIAL CHANGE IN # OF vCPUs | -3 vCPUs |
| POTENTIAL CHANGE IN GB OF vRAM | -47 vRAM |
| 1 OF 1 | MAX PER PAGE: 10 ▽ |

FIG. 10a

| ⊞ VM SIZING REPORT - CORPORATE | | | | | | | | | |
|---|---|---|---|---|---|---|---|---|---|
| VM | OS | vCPU CONFIG. | vCPUs RESIZE | CPU UTIL | vRAM CONFIG. | vRAM RESIZE | MEM UTIL | STORAGE CONFIG. | STORAGE UTIL |
| INTEROP-IDENTITY MANAGER SERVER | WINNETENTERPRISEGUEST | 1 | 2▲ | 100% | 2 | 1▼ | 29% | 67GB | 64% |
| sl57_arcserve-production_dod3-sl57 | WINDOWS7SERVER64GUEST | 2 | 4▲ | 99% | 8 | 4▼ | 29% | 213GB | 88% |
| s83_arcserve-production_dod10-s83 | WINDOWS7SERVER64GUEST | 2 | 4▲ | 88% | 4 | 4▲ | 54% | 213GB | 47% |
| s34_arcserve-production_dod8-s34 | WINDOWS7SERVER64GUEST | 2 | 4▲ | 76% | 4 | 3▼ | 49% | GB | % |
| s254_nimsoftdod7.6.1_dod12-s254 | WINDOWS7SERVER64GUEST | 1 | 2▲ | 71% | 8 | 8 | 62% | 156GB | 38% |
| usilsc97_244.186 | WINDOWS7SERVER64GUEST | 2 | 2▲ | 43% | 4 | 4▼ | 31% | GB | % |
| s99_dipex10 | WINDOWS7SERVER64GUEST | 1 | 1 | 34% | 8 | 2▼ | 34% | 122GB | 52% |
| usilsc96_244.146 | WINDOWS7SERVER64GUEST | 2 | 1▼ | 26% | 8 | 6▼ | 48% | 113GB | 82% |
| s09-vcenter | WINDOWS7SERVER64GUEST | 2 | 1▼ | 17% | 4 | 2▼ | 32% | 94GB | 54% |
| s09-mssql | WINDOWS7SERVER64GUEST | 2 | 1▼ | 11% | 4 | 2▼ | 21% | 94GB | 50% |

VM CPU-MEM PROJECTION-CORPORATE 20%

| PROJECTION INTERVAL | CURRENT STATE CPU/MEM | RESOURCE BREACH CPU/MEM | CPU PROJECTIONS | MEMORY PROJECTIONS |
|---|---|---|---|---|
| usiistun40 | ☐☐ | -/6 | ☐☐☐☐☐☐☐☐☐☐☐☐☐☐☐☐☐☐☐☐☐☐ | ☒☒☒☒☒☒☒☒☒☒☒☒☒☒☒☒☒☒☒☒☒☒ |
| dod-na-vstn-p17 | ☐☐ | -/18 | ☐☐☐☐☐☐☐☐☐☐☐☐☐☐☐☐☐☐☐☐☐☐ | ☐☐☐☐☐☐☐☐☐☐☐☐☐☐☐☐☐☐☐☐☐☐ |
| reno120-siteminderpolicy | ☐☐ | -/17 | ☐☐☐☐☐☐☐☐☐☐☐☐☐☐☐☐☐☐☐☐☐☐ | ☒☒☒☒☒☒☒☒☒☒☒☒☒☒☒☒☒☒☒☒☒☒ |
| p14-open_acesswin7client2 | ☐☐ | -/17 | ☐☐☐☐☐☐☐☐☐☐☐☐☐☐☐☐☐☐☐☐☐☐ | ☐☐☐☐☐☐☐☐☐☐☐☐☐☐☐☐☐☐☐☐☐☐ |
| s01_usildodpam3 | ☐☐ | -/- | ☐☐☐☐☐☐☐☐☐☐☐☐☐☐☐☐☐☐☐☐☐☐ | ☐☐☐☐☐☐☐☐☐☐☐☐☐☐☐☐☐☐☐☐☐☐ |
| dod-na-aim-p04 | ☐☐ | -/- | ☐☐☐☐☐☐☐☐☐☐☐☐☐☐☐☐☐☐☐☐☐☐ | ☐☐☐☐☐☐☐☐☐☐☐☐☐☐☐☐☐☐☐☐☐☐ |
| dod-na-vstn-p05 | ☐☐ | -/- | ☐☐☐☐☐☐☐☐☐☐☐☐☐☐☐☐☐☐☐☐☐☐ | ☐☐☐☐☐☐☐☐☐☐☐☐☐☐☐☐☐☐☐☐☐☐ |
| dod-na-xrx-d03 | ☐☐ | -/- | ☐☐☐☐☐☐☐☐☐☐☐☐☐☐☐☐☐☐☐☐☐☐ | ☐☐☐☐☐☐☐☐☐☐☐☐☐☐☐☐☐☐☐☐☐☐ |
| pfsense-vpc_gateway | ☐☐ | -/- | ☐☐☐☐☐☐☐☐☐☐☐☐☐☐☐☐☐☐☐☐☐☐ | ☐☐☐☐☐☐☐☐☐☐☐☐☐☐☐☐☐☐☐☐☐☐ |
| dod-na-vstn-p13 | ☐☐ | -/- | ☐☐☐☐☐☐☐☐☐☐☐☐☐☐☐☐☐☐☐☐☐☐ | ☐☐☐☐☐☐☐☐☐☐☐☐☐☐☐☐☐☐☐☐☐☐ |

VM CPU PROJECTION REPORT-CORPORATE

| PROJECTION INTERVAL | CURRENT STATE | INTERVAL BREACH | 1 | 2 | 3 | 4 | 5 | 6 | 7 | 8 |
|---|---|---|---|---|---|---|---|---|---|---|
| interop-identity manager server | 108% | 0 | 130% | 156% | 187% | 224% | 269% | 322% | 387% | 464% |
| s09-esx-storage | 4% | 17 | 5% | 6% | 7% | 8% | 10% | 12% | 14% | 17% |
| s99_dlpcms01 | 4% | 16 | 5% | 6% | 8% | 9% | 11% | 13% | 16% | 19% |
| s99_dlpex10 | 62% | 2 | 74% | 89% | 107% | 128% | 154% | 184% | 221% | 265% |
| s99_dlppe01 | 3% | 18 | 4% | 5% | 6% | 7% | 8% | 10% | 12% | 14% |
| coe-vaim | 8% | 13 | 10% | 12% | 15% | 18% | 21% | 25% | 30% | 36% |
| reno120 - siteminderpolicy | 1% | - | 1% | 2% | 2% | 3% | 3% | 4% | 4% | 5% |
| dod-na-clkv-p02 | 17% | 9 | 20% | 24% | 29% | 35% | 42% | 50% | 60% | 73% |
| dod-na-vstn-p14 | 1% | - | 1% | 2% | 2% | 2% | 3% | 4% | 4% | 5% |
| dod-na-vstn-p15 | 2% | - | 2% | 2% | 3% | 3% | 4% | 5% | 6% | 7% |

VM MEM PROJECTION REPORT-CORPORATE

| PROJECTION INTERVAL | CURRENT STATE | INTERVAL BREACH | 1 | 2 | 3 | 4 | 5 | 6 | 7 | 8 |
|---|---|---|---|---|---|---|---|---|---|---|
| interop-identity manager server | 28% | 10 | 30% | 33% | 36% | 40% | 45% | 50% | 57% | 65% |
| s09-esx-storage | 1% | - | 2% | 2% | 2% | 2% | 2% | 3% | 3% | 3% |
| s99_dlpcms01 | 4% | - | 5% | 5% | 6% | 6% | 7% | 8% | 9% | 10% |
| s99_dlpex10 | 38% | 8 | 41% | 44% | 49% | 54% | 60% | 68% | 77% | 87% |
| s99_dlppe01 | 3% | - | 3% | 3% | 4% | 4% | 5% | 5% | 6% | 7% |
| coe-vaim | 18% | 13 | 19% | 21% | 23% | 25% | 28% | 32% | 36% | 41% |
| reno120 - siteminderpolicy | 9% | 17 | 10% | 10% | 12% | 13% | 14% | 16% | 18% | 21% |
| dod-na-clkv-p02 | 4% | - | 4% | 4% | 5% | 5% | 6% | 6% | 7% | 8% |
| dod-na-vstn-pl4 | 2% | - | 2% | 2% | 2% | 2% | 2% | 3% | 3% | 4% |
| dod-na-vstn-pl5 | 1% | - | 2% | 2% | 2% | 2% | 2% | 3% | 3% | 3% |

VM CPU-MEM PROJECTION-CORPORATE 20%

| PROJECTION INTERVAL | CURRENT STATE CPU/MEM | RESOURCE BREACH CPU/MEM ▽ | CPU PROJECTIONS |
|---|---|---|---|
| coe-apm | | 9/8 | |
| dod-na-nsft-p01 | | 9/6 | |
| dod-na-cptymgr-p01-vpm | | 9/12 | |
| sl57_arcserve-production_dod3-sl57 | | 9/11 | |
| dod-na-pam-p02 | | 9/11 | |
| s09-vcenter | | 9/10 | |
| s01_dod-na-mdb-p01 | | 9/- | |
| dod-na-vlkv-p02 | | 9/- | |
| tixchange-db | | 8/17 | |
| usilscl8b | | 8/16 | |
| usildocpam3 | | 8/11 | |
| usilsc96_244.146 | | 6/5 | |
| dod-na-xrx-d01 | | 6/12 | |
| dod-na-xrx-d02 | | 6/10 | |
| usilsc97_244.186 | | 5/4 | |
| dod-na-pam-d01 | | 5/11 | |
| tixcharge-appl | | 4/15 | |
| s01_dod-na-pam-p02 | | 3/11 | |
| s99_dlpex10 | | 2/8 | |
| s01_dod-na-sc-p01 | | 2/16 | |
| coe-home | | 18/18 | |
| s99_dlpwin7 | | 18/18 | |
| coe-eisa | | 18/18 | |

FIG. 12D

MODELING REAL CAPACITY CONSUMPTION CHANGES USING PROCESS-LEVEL DATA

BACKGROUND

The disclosure relates generally to real capacity consumption, and more specifically to modeling real capacity consumption changes using process-level data.

SUMMARY

According to one embodiment of the disclosure, a method includes receiving an expected growth rate for modeling future capacity utilization for a resource hosting a plurality of processes, each process being associated with a respective workload. The method also includes modifying, in a non-linear capacity utilization model for the resource, the respective workload for a particular process in the plurality of processes based on the expected growth rate, and, in response to modifying the respective workload, determining a change in total capacity utilization for the resource using the non-linear capacity utilization model. The method further includes determining a ratio between the change in the total capacity utilization for the resource and the modification to the respective workload. The method additionally includes modifying, based on the ratio, a configuration of the resource with respect to the particular process in anticipation of the expected growth rate.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

FIG. 5 illustrates differences between projections of linear CPU utilization and projections of capacity consumption based on a non-linear capacity consumption model or scalability model in accordance with a non-limiting embodiment of the present disclosure.

FIG. 9 illustrates an example user interface for displaying results of a forecast threshold analysis by service or process group in a system for modeling real capacity consumption changes using process-level data in accordance with a non-limiting embodiment of the present disclosure.

FIG. 10A illustrates an example user interface for displaying service optimization recommendations in a system for modeling real capacity consumption changes using process-level data in accordance with a non-limiting embodiment of the present disclosure.

FIG. 10B illustrates an example user interface for displaying a virtual machine sizing report in a system for modeling real capacity consumption changes using process-level data in accordance with a non-limiting embodiment of the present disclosure.

FIG. 12A illustrates CPU and memory projection reports for various virtual machines in accordance with a particular non-limiting embodiment of the present disclosure.

FIG. 12B illustrates CPU and memory projection reports for various virtual machines in accordance with a particular non-limiting embodiment of the present disclosure.

FIG. 12C illustrates CPU and memory projection reports for various virtual machines in accordance with a particular non-limiting embodiment of the present disclosure.

FIG. 12D illustrates CPU and memory projection reports for various virtual machines in accordance with a particular non-limiting embodiment of the present disclosure.

DETAILED DESCRIPTION

Figure 1:
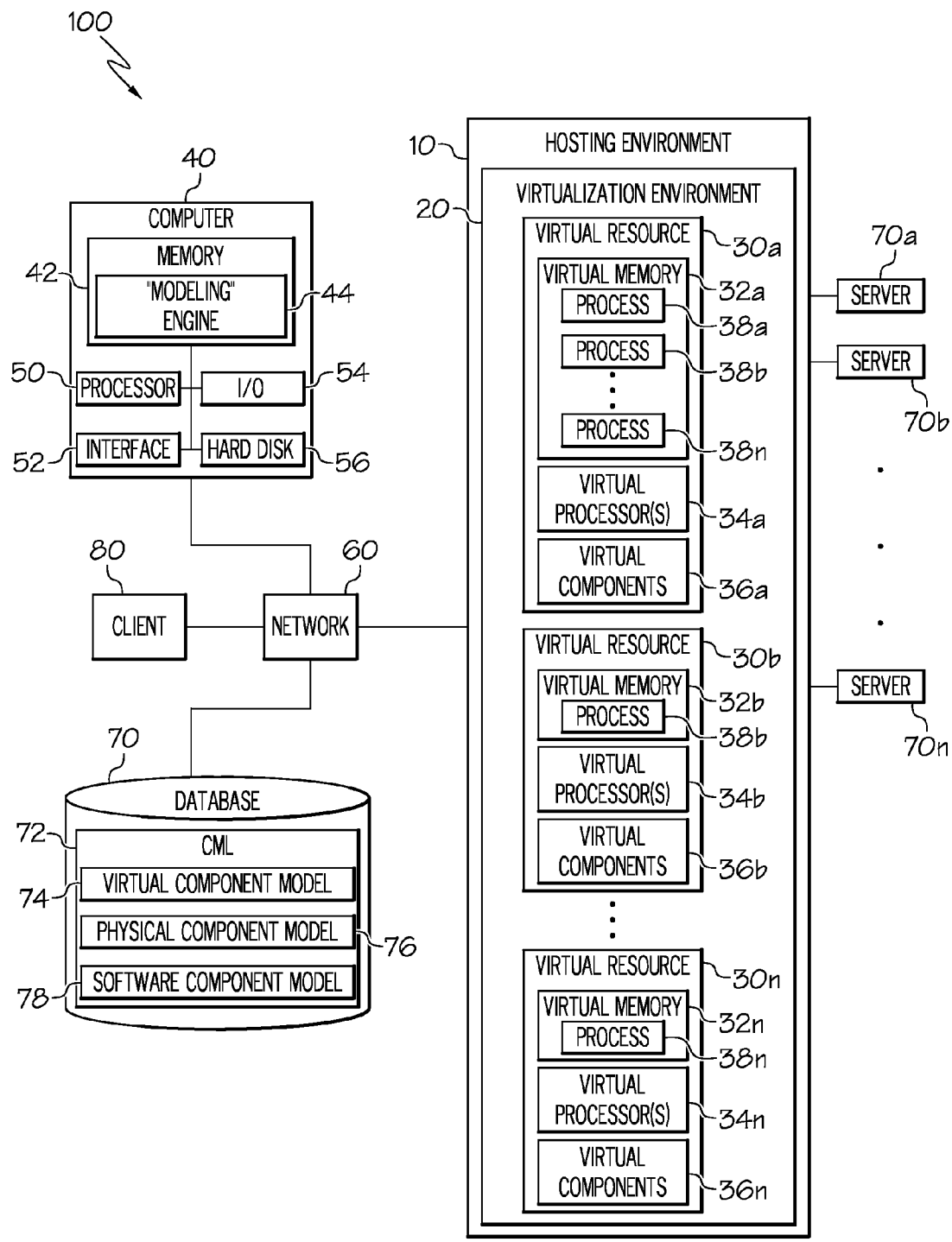
FIG. 1 illustrates a block diagram of a system for modeling real capacity consumption changes using process-level data in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Capacity management systems assist IT administrators in understanding capacity needs, optimizing asset utilization and cutting costs across large scale IT environments. Capacity management systems also help maintain higher service levels across high-volume physical, virtual and cloud environments while helping to reduce capital expenditures and operating expenditures associated with hardware, software, power, and cooling. In addition, these systems may help manage information technology changes with tools that predict the impact of workload increases, architectural changes or new application deployments.

Some capacity management systems include capacity modeling capabilities, wherein resource utilization and capacity are projected for a particular IT infrastructure. Capacity management systems may also include resource management functionality that assists administrators by interpreting capacity modeling results into actionable analysis. The results of the analysis aids in optimizing workload placement and right-sizing of resources.

Virtual resource management software may utilize capacity modeling processes to, for example, analyze workload placement and right-sizing of virtual resources, tailor virtual resource provisioning to an organization's needs, and optimize resource capacity and performance. Models may be generated using a library of virtual and/or physical computing components (i.e., the component model library, or "CML"). The CML may include models for a variety of platforms, resources, virtualization products, operating systems, processor architectures, and/or memory configurations. Models from the CML may be used to model performance of a virtualization environment by selecting models that correspond to each virtual resource in the environment.

Resource scores may be generated for each virtual resource based on the selected CML models and current utilization metrics. Resource scores are a normalized, platform independent metric for identifying under/over-utilized virtual resources for consolidation and/or redeployment.

Current capacity management tools collect various system and sub-system level information. However, scalability of underlying infrastructure resources may be unclear from these outputs alone. For example, capacity data from traditional systems may estimate resource capacity using a linear measurement of CPU utilization. The linear measurement may include a determination of how "busy" the CPU, or other resource, is over a period of time. Thus, if the resource is 25% full or busy, current systems may estimate that there is 75% of headroom available. Using this logic, an administrator may schedule four times as much work for the system.

However, such a measurement of resource utilization may not accurately reflect the true capacity consumption. Such systems often have no concept of the maximum real capacity, or the current real consumption of system resources. For example, a CPU often cannot run at 100% utilization using traditional utilization measurement techniques unless the executing code is almost impossibly optimized, or—in the multi-threaded architectures of today—unless code across multiple threads is optimized. This is nearly impossible to achieve with even the most basic processes. Thus, when managing or administering execution of applications and services, it is important to accurately gauge the amount of real capacity headroom and consumption so that utilization can be optimized.

Many organizations are challenged with determining the effect of individual processes on overall system performance. For example, projected workload growth may vary across applications or processes. Capacity management operations may require accounting for these changes and determining their effect on capacity consumption and headroom of various system resources. Virtual placement management systems also account for and predict resource capacity and utilization metrics in determining optimal placement, consolidation, and right-sizing of virtual resources. Certain embodiments of the present disclosure provide tools for better predicting real performance capacity and consumption metrics using process-level data. The system may enable administrators to model workload placement configurations to better prepare for future growth.

In certain embodiments, changes in workloads for process-level data are modeled in the context of servicing a particular application. In one particular example, projected capacity headroom and utilization data for one particular resource that diverges from a predetermined threshold is determined. Associated resources are determined for modeling and various scenarios are modeled. Scenarios may include various configuration changes, workload modifications, consolidations, and/or expansions of resources assigned to execution of the particular application.

With reference to FIG. 1, a system 100 for selecting resources for modeling real capacity consumption changes using process level data is illustrated in accordance with a non-limiting embodiment of the present disclosure. System 100 includes computer 40, database 70, hosting environment 10, and client 80, which are all connected via network 60. Computer 40 includes memory 42, processor 50, I/O 54, interface 52, and hard disk 56. Processor 50 loads instructions from hard disk 56 and executes them in memory 42. For example, processor 50 executes a modeling engine 44 in memory 42. Modeling engine 44 receives system monitoring data for a hosting environment 10 including servers 70a-n and virtual resources 30a-n, as well as component data for resource components, such as virtual memories 32a-n and virtual processors 34a-n, and process-level data for processes 38a-n. Modeling engine 44 determines real capacity consumption and utilization metrics based on the received data.

For example, modeling engine 44 receives linear CPU capacity utilization data from virtual processors 34a-n in accordance with a related system monitoring application. Modeling engine 44 generates resource capacity and consumption metrics using a corresponding non-linear scalability model or a non-linear capacity consumption and utilization model. The models may be selected from database 70 component model library ("CML") 72. In this example, component models are selected and combined to create a customized representation of system capacity and consumption for each resource. Component models are selected for each of virtual resource 30a-n, virtual memory 32a-n, virtual processors 34a-n, and other virtual components 36a-n. These models are combined and linear capacity data is used to generate "real" capacity consumption metrics, using the assembled resource models. Modeling engine 44 may store results of these calculations in database 70.

Modeling engine 44 may further model individual processes using resource models. For example, modeling engine 44 may determine workload placement and total capacity utilization or headroom for virtual resource 30a. A user may input an expected growth rate into the system using client 80. Modeling engine 44 may generate a scenario where workload for the process 38a is increased by the received growth rate. Modeling engine 44 may determine the change in the total capacity utilization or headroom for that virtual resource 30a. Modeling engine 44 determines a ratio between the workload increase for process 38a and the overall capacity consumption change. Thus, the overall impact of process 38a can be determined. The ratio is applied in virtual placement and capacity modeling operations.

In particular embodiments, the above described analysis is conducted for each process 38a-n on each virtual resource 30a and/or physical resource (not pictured). In certain embodiments, processes associated with particular applications or services are selected for modeling to determine the impact of a growth in a particular application or service's popularity. For example, if an organization hires a large number of accounting department employees, productivity software application associated with accountants are determined and related processes are modeled. Resources are configured and sized in order to meet the expected growth rate using optimal configurations. This finds the root cause of capacity consumption growth and targets the specific processes that are the cause of the capacity consumption growth.

Such a system also isolates changes in certain static-usage processes, such as system-level processes, that do not experience increased workloads when more users are using applications. For example, server operating system process workloads tend to remain relatively static throughout high-utilization periods and low-utilization periods. Thus, a system that models changes to only those processes that are expected to experience workload changes, as opposed to those processes that are expected to remain static, will portray a more accurate model of capacity consumption and utilization so that resource placement and consolidation can be optimized.

For example, process 38a is a system process, while process 38b services a client facing sales application and 38c (not illustrated) services an internal productivity application. Administrators expect growth in capacity consumption levels of virtual resource 30a. However, modeling a general increase in capacity consumption and utilization levels for the resources of virtual resource 30a may not provide the most accurate picture because the increased workload is applied generally across all processes. However, if the administrator has data that is slightly more discriminating, such as data showing that use of a particular application is expected to grow over the next month, that data may be applied as a growth rate to a particular process. Process 38a and 38c workloads remain unchanged, while process 38b workload is increased. Capacity consumption and utilization is determined in the model. Thus, a more accurate representation of real capacity consumption is generated by applying growth to only those processes that are expected to experience an increase in usage. Additional metrics may be generated to better understand process-level workload growth by measuring various changes in process workloads and total resource capacity and consumption in a model.

Figure 2:
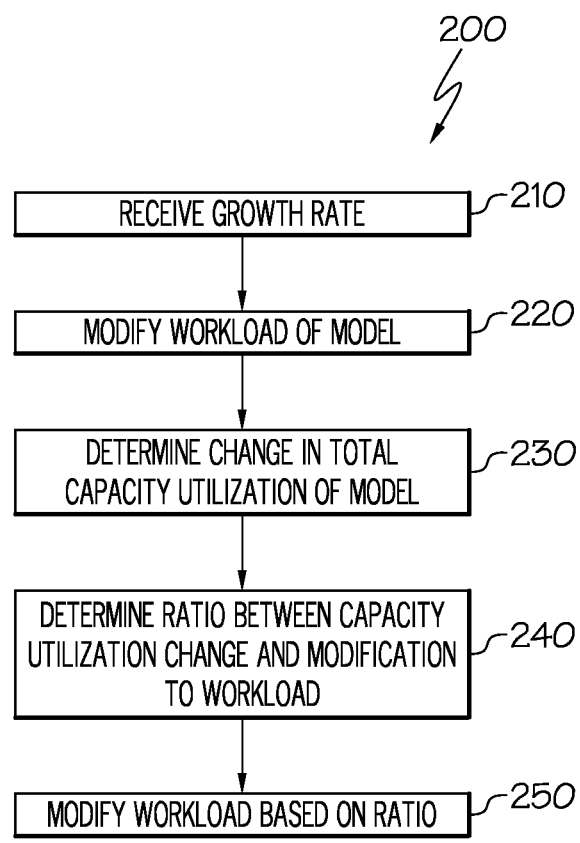
FIG. 2 illustrates a flow chart of a method modeling real capacity consumption changes using process-level data in accordance with a non-limiting embodiment of the present disclosure.

With reference to FIG. 2, a system for modeling capacity consumption changes with process-level data is illustrated in accordance with a particular non-limiting embodiment of the present disclosure. At step 210, a growth rate is received. For example, a user inputs an expected growth rate for a particular application, service, or process.

At step 220, the workload of a model for a particular resource or set of resources is modified. For example, processes corresponding to the particular application that the user specified are determined. Those processes are associated with particular resources, which each are associated with a customized non-linear scalability or capacity consumption model. Workloads for each of the associated processes in each of the models are increased.

A change in the total capacity utilization of the model is determined at step 230. This may be determined in response to increasing the workload of the particular processes. For example, workload increases are modeled for each process associated with a particular application. The processes may span across resources, servers, or data centers.

Changes in total capacity utilization are mapped to the increases in process-level workload to determine a ratio at step 240. Thus, a specific rate of capacity consumption can be mapped to a specific increase in workload. Thus, the impact of changes in application usage can be directly mapped to increases in resource utilization.

At step 250, workload placement is modified based on the determined ratio. For example, workloads may be re-assigned to different resources based on the determined ratio. Additionally or alternatively, resources may be reconfigured and applications may be re-assigned to help distribute the anticipated workload or help consolidate existing resources.

In certain embodiments, the growth rate may be negative. For example, if the system predicts less utilization due to a particular application, negative growth rates are modeled and applications and/or resources can be selected for consolidation based on the process-level data.

Various scenarios may be generated and modeled based on the selected resources. For example, a scenario where applications hosted by several resources are hosted by one resource may be generated in a consolidation scenario. The system may select and implement the resource configuration for the most efficient scenario.

The teachings of the present disclosure may utilize a non-linear scalability model, which may also be used in the capacity modeling space, to determine real capacity consumption and headroom data. For example, a portable, vendor-independent performance score may be a collection of platform independent calculations of that characterize the capacity of a system to provide resources to users of the system and characterize the consumption of those resources. A portable, vendor-independent performance score may be referred to as a resource score. In certain configurations, CPU resource score is a computed value of the capacity of a target system to deliver CPU computing power to applications, taking into account unique scalability characteristics of the host hardware, operating system, and virtualization environment. A resource score may include scores for other components within a system, such as memory, network, and storage I/O. Thus, reporting of aggregate computing capacity across individual—or groups of—hosts, virtual machines, or datacenters may be reported, managed, and modeled, thus advancing the overall understanding of performance management in enterprise IT infrastructures.

A more detailed description of portable, vendor-independent performance scores and modeling is contained in U.S. Patent Application Publication No. 2014/0019964 A1 and is incorporated herein by reference.

The various portable, vendor-independent performance scores, performance metrics, real utilization measurements, real capacity measurements, and the like, that are described in various embodiments of the present disclosure may be portable. In other words, resource scores may allow comparisons between heterogeneous hardware and software systems. For example, resource scores may permit a true comparison between true capacity of a legacy, aging system and a more modern system. This comparison may be made without regard to software components running on the systems.

Portable, vendor-independent performance scores may be used to model and/or predict performance of proposed system configurations. Such modeling may allow IT managers to more effectively plan hardware and software provisioning and procurement strategies to maximize desired performance metrics associated with those systems.

Portable, vendor-independent performance scores can be determined based on a corresponding component model for each particular hardware/software configuration. For example, component models may be generated for a set of hardware architectures, operating systems, and/or virtualization platforms. The component models may be associated with corresponding non-linear real capacity/consumption performance scalability models that evaluate, predict, and/or model system performance for a particular architecture. In certain embodiments, these models are predefined. In certain embodiments, these models may be generated by benchmarking, analyzing, and evaluating component performance until a realistic non-linear component performance model can be generated that realistically models performance of the component.

Component models may be grouped into a subset of models, e.g., a component model library. Various combinations of component models are selected to match a particular system configuration. In certain embodiments, this selection is automated. For example, a system may discover the various hardware and software components that make up a certain system configuration. In a data center, the system may discover each distinct hardware component architecture, including type of processors, number of processors, threads, cores, hyper-threading capabilities, memory capacity, busses, terminals, cache and other on-chip memory capacity, and the like.

The system may select a component model from the component model library that matches the discovered hardware architecture. In data center or other grouping of heterogeneous hardware components, each hardware component may have a corresponding model in the component model library. Similarly, the system may further discover various operating system and other software application components. For example, the system may discover a WINDOWS SERVER 2008™ operating system running on a particular hardware component. A corresponding component model library component model may be selected to match the hardware and operating system of the matching component. The system may additionally discover any virtualization software running on one or more particular servers. The system may additionally determine virtual system configurations, such as virtual provisioned system resources, operating systems, and the like. A corresponding component model may be selected for the virtualization platform, while also accounting for the underlying physical hardware and operating system architectures in any generated resource scores.

In addition to component models, a particular benchmark may be used to calculate a portable, platform and vendor independent resource score. In certain embodiments, the STANDARD PERFORMANCE EVALUATION CORPO- RATION™ ("SPEC") benchmark may be used. In certain configurations other benchmarking standards may be used.

In certain embodiments, the component library models may fill in missing pieces of the performance scores/estimations generated by a benchmark. For example, a benchmark may test system performance when the system is running at maximum load. Thus, component models may model performance of the component when system load is at various stages below maximum load capacity. Thus, the component benchmarking score may be just one piece in the overall determination of a portable, vendor-independent performance score.

A portable, vendor-independent performance score may be used to express one or more of capacity of a system to execute new work, jobs, loads, applications, and/or requests, and consumption of entities running on that system. Capacity may be determined using basic benchmarking performance information, the specific configuration information of a particular system, a component model of hardware scalability for the particular configuration and operating system and/or virtualization technology scalability model.

The portable, vendor-independent performance score may be used to model capacity utilization for a particular resource configuration. In certain embodiments, resource configurations may be specified in scenarios. Models may be generated for each scenario. A performance score describes real capacity and consumption metrics for each scenario.

Figure 3:
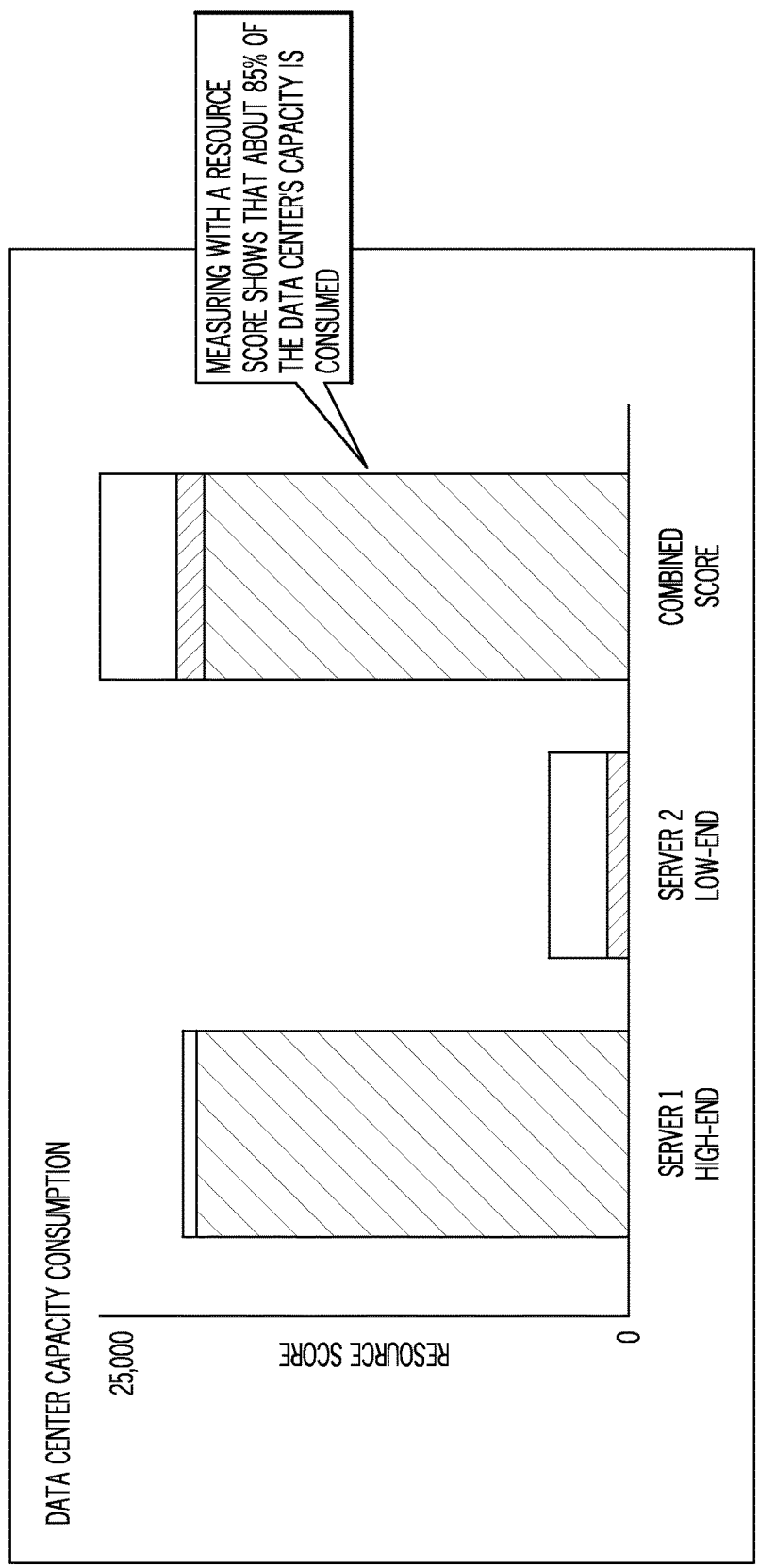
FIG. 3 illustrates an example of real capacity consumption among resources and combined data center capacity consumption in accordance with a non-limiting embodiment of the present disclosure.

With reference to FIG. 3 as an example, real capacity consumption among heterogeneous resources is illustrated in accordance with a non-limiting embodiment of the present disclosure. Specifically, FIG. 3 shows a high-end server 1, a low-end server 2, and a combined capacity consumption resource score for the data center that comprises servers 1 and 2. Server 1 capacity consumption is near full capacity, while server 2 capacity consumption is at roughly 25% of capacity. Traditionally, categorization or scoring of actual or real capacity metrics was impossible. For example, each vendor would provide a linear output of resource consumption based solely on the amount of activity for the resource. However, due to the complex nature of integrated system components, these outputs are inaccurate. For example, a CPU at 90% utilization cannot actually accommodate 10% more operations. Rather, inherent limitations in the system architecture may prevent a CPU at 90% utilization from executing any additional instructions. Thus, real capacity consumption and utilization resource scores may more accurately gauge resource headroom.

Further, such resources scores may provide a portable, vendor-independent headroom calculation. Thus, as referenced in FIG. 3 servers 1 and 2 may be combined to provide a combined score and available headroom of the data center.

Figure 4:
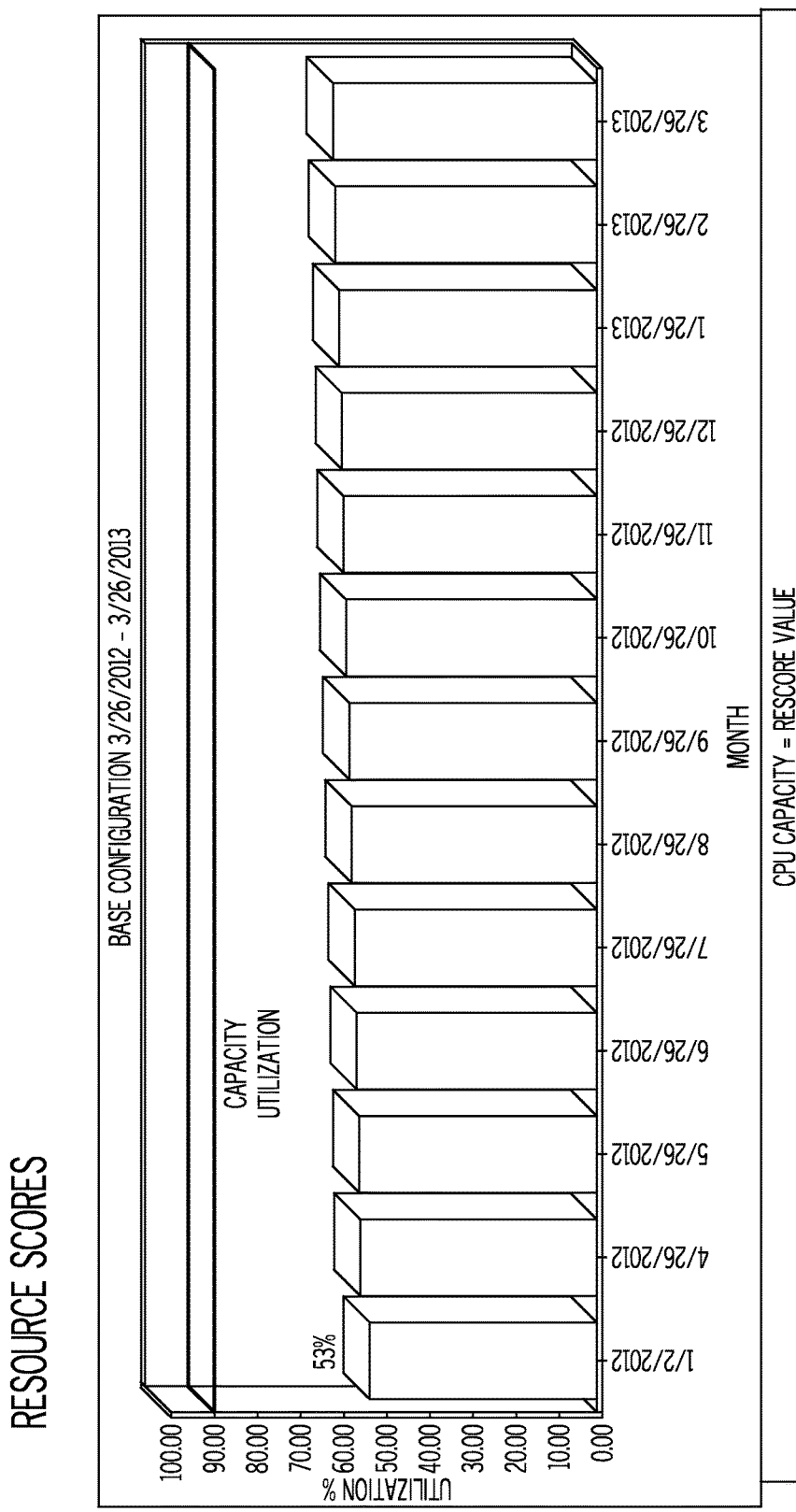
FIG. 4 illustrates CPU capacity utilization for a particular resource configuration over several months in accordance with a non-limiting embodiment of the present disclosure.

With reference to FIG. 4, CPU capacity utilization for a particular resource configuration over several months is illustrated in accordance with a non-limiting embodiment of the present disclosure. Such a figure may be displayed in a user interface in the systems described in the present disclosure. For example, resources selected for capacity consumption modeling may be analyzed for various scenarios that include various workload placement and configuration parameters. The results of a particular scenario may be summarized in a chart, such as the chart of FIG. 4.

FIG. 4 additionally or alternatively may illustrate the capacity utilization data projections described in the systems of the present disclosure. For example, a user may select a baseline dataset, such as the months of January 2012 and April 2012. The system may apply a linear regression analysis on this dataset and project the data using a non-linear scalability model. For example, the data may be projected through March 2013.

With reference to FIG. 5, the differences between traditional linear CPU projection analysis and capacity utilization modeling projections are illustrated in accordance with a particular non-limiting embodiment of the present disclosure. The capacity modeling projections may be based on a customized model for the particular resource being modeled. Thus, the capacity modeling projection may be a more accurate gauge of projected capacity utilization and headroom.

Figure 6:
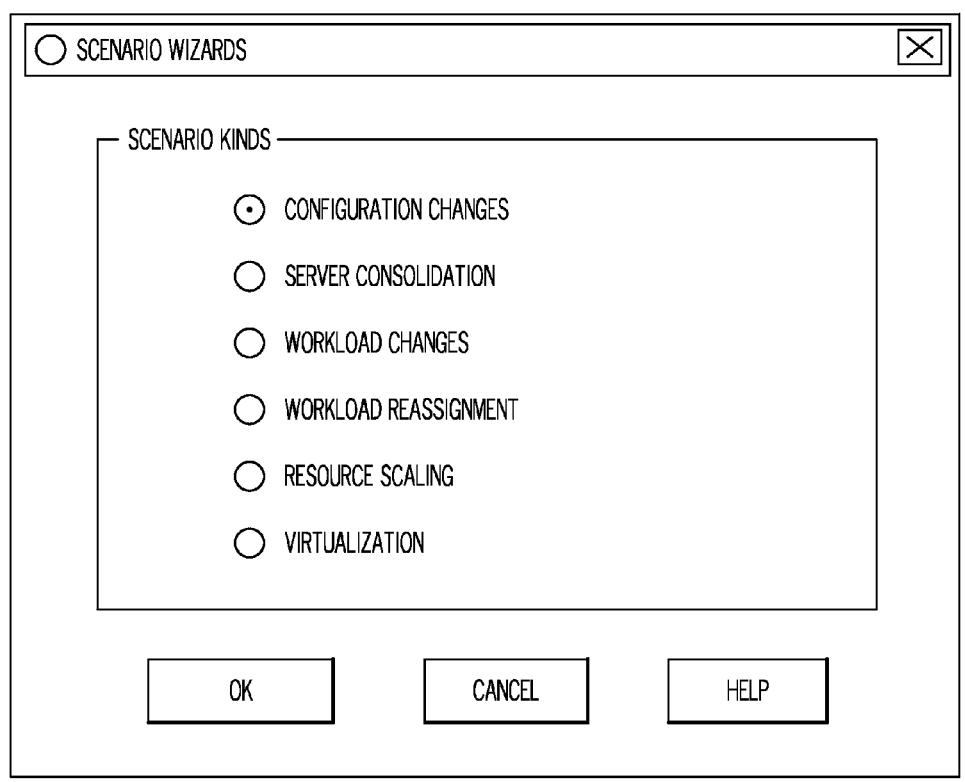
FIG. 6 illustrates an example user interface for selecting various categories of modeling scenarios in accordance with a non-limiting embodiment of the present disclosure.

With reference to FIG. 6, an example user interface for selecting various categories of modeling scenarios is illustrated in accordance with a non-limiting embodiment of the present disclosure. For example, a user may be presented with such a user interface during an initialization step. The user may select the type of scenario to add to a set of scenarios. This particular user interface shows the user has selected configuration changes as the scenario or group of scenarios to model. Thus, the system may determine critical resources using forecast thresholds and may model various scenarios dealing with configuration changes for those critical resources. Other options may include server consolidation, workload changes, workload reassignment, resource scaling, virtualization changes, and the like. Scenarios may be based on any other type of configuration change related to modeling data center resources, networking, computing components, applications, or the like.

Figure 7:
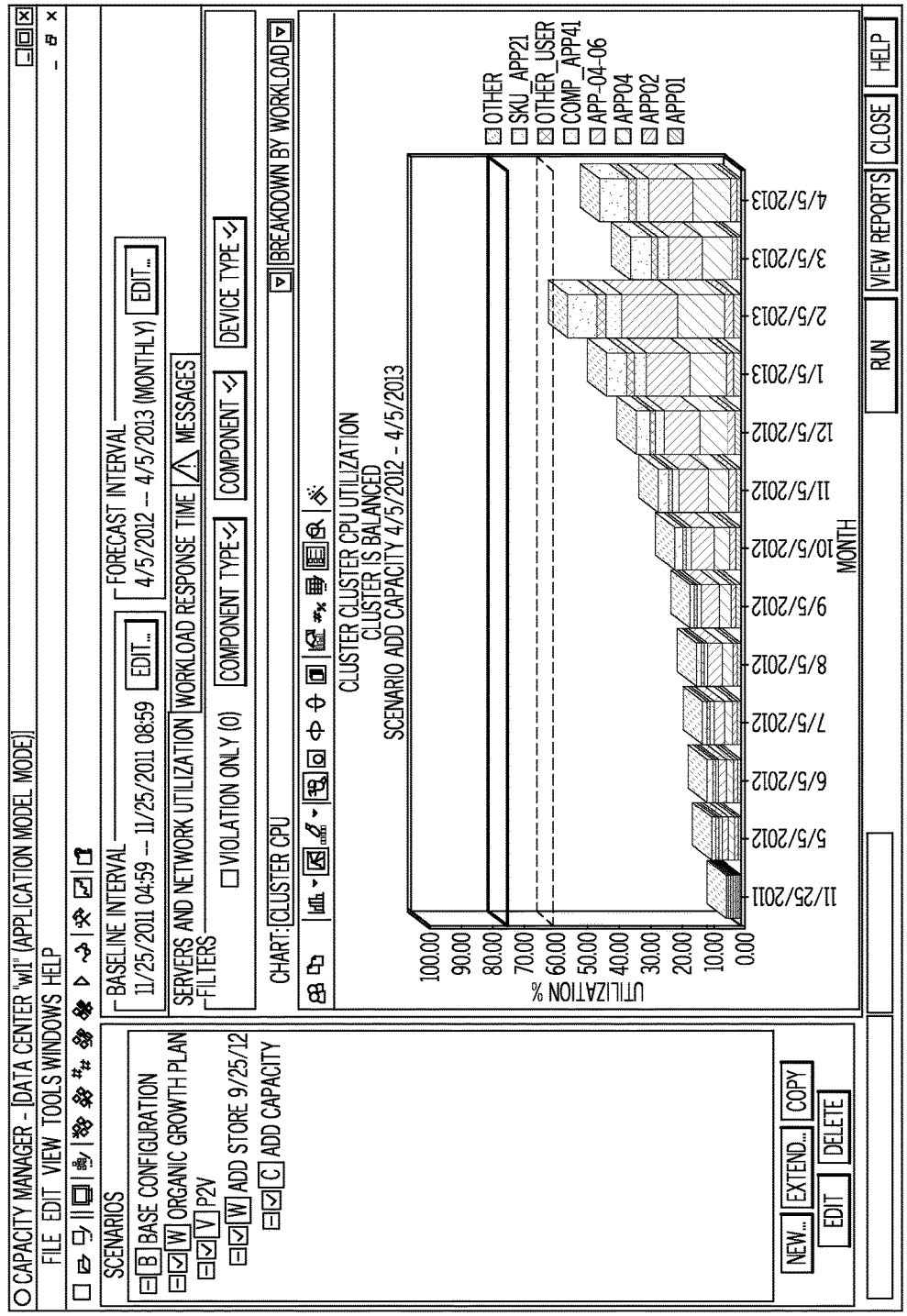
FIG. 7 illustrates an example user interface for executing and displaying scenario models in accordance with a non-limiting embodiment of the present disclosure.

With reference to FIG. 7, an example user interface for executing and displaying scenario models is illustrated in accordance with a non-limiting embodiment of the present disclosure. Such a user interface may be used to configure, schedule, and analyze results of capacity and consumption modeling operations and or virtual machine placement or sizing management operations. For example, several scenarios may be modeled in the scenarios pane of the user interface, while capacity utilization modeling data including resource score information may be presented in the chart pane. Filters and baseline intervals may additionally be set in each respective user interface pane. For example, a user may select the baseline interval set from which to select a baseline data set of capacity consumption data. The forecast interval may additionally be set. Filters for various forecast thresholds may be set. For example, a forecast threshold regarding servers and network utilization may be set. Additional filters may relate to workload response time. Various other user interface panels may be present in various embodiments of the present disclosure.

Figure 8:
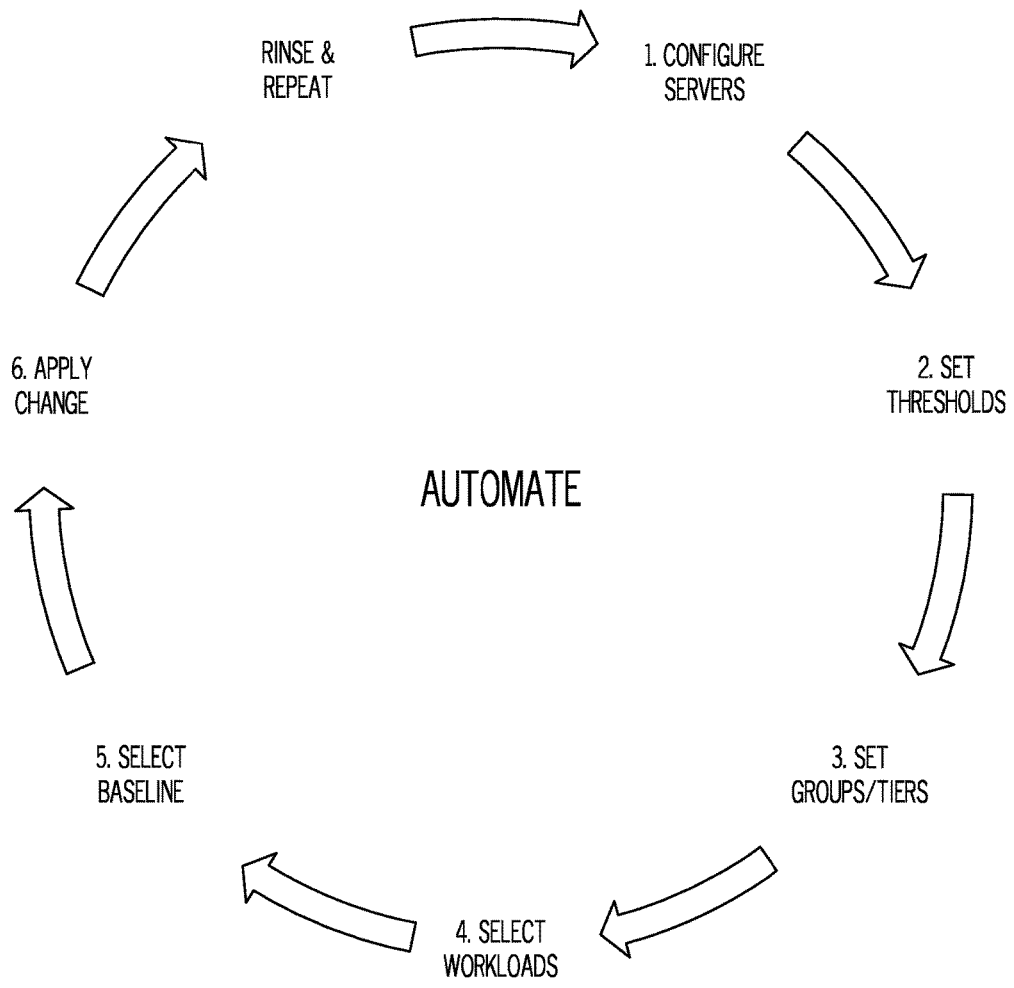
FIG. 8 illustrates a flow chart of steps in capacity planning in a system for selecting resources for automatic modeling using forecast thresholds in accordance with a non-limiting embodiment of the present disclosure.

With reference to FIG. 8, a flow chart of steps used in capacity planning operations for a particular embodiment of the present disclosure is illustrated. Generally, scenarios are configured, thresholds are set, and tiers of resources are set. Workloads are placed and or modified according to a growth rate. Baseline data is selected. For example, a historical time period is selected for retrieving a baseline data set. Scenario changes are applied for each model and the process is repeated. The teachings of the present disclosure may automate these steps to aid administrators in infrastructure management, capacity planning, virtual resource management, and workload placement operations.

With reference to FIG. 9, an example user interface for displaying results of a forecast threshold analysis is illustrated in accordance with a non-limiting embodiment of the present disclosure. The user interface of FIG. 9 shows the number of resources trending towards or deviating from a threshold organized by service sector. The user interface additionally allows users to model scenarios targeted specifically for the service sector. For example, service profile, service optimization, and/or service forecast may be clicked to initiate modeling operations for the critical resources associated with each service.

With reference to FIG. 10A, a user interface for displaying service optimization recommendations is illustrated in accordance with another embodiment of the present disclosure. FIG. 10B illustrates virtual resource sizing reports for particular resources. Such a user interface may show a recommended resize operation for each resource based on trended capacity utilization and consumption or headroom data.

Figure 11:
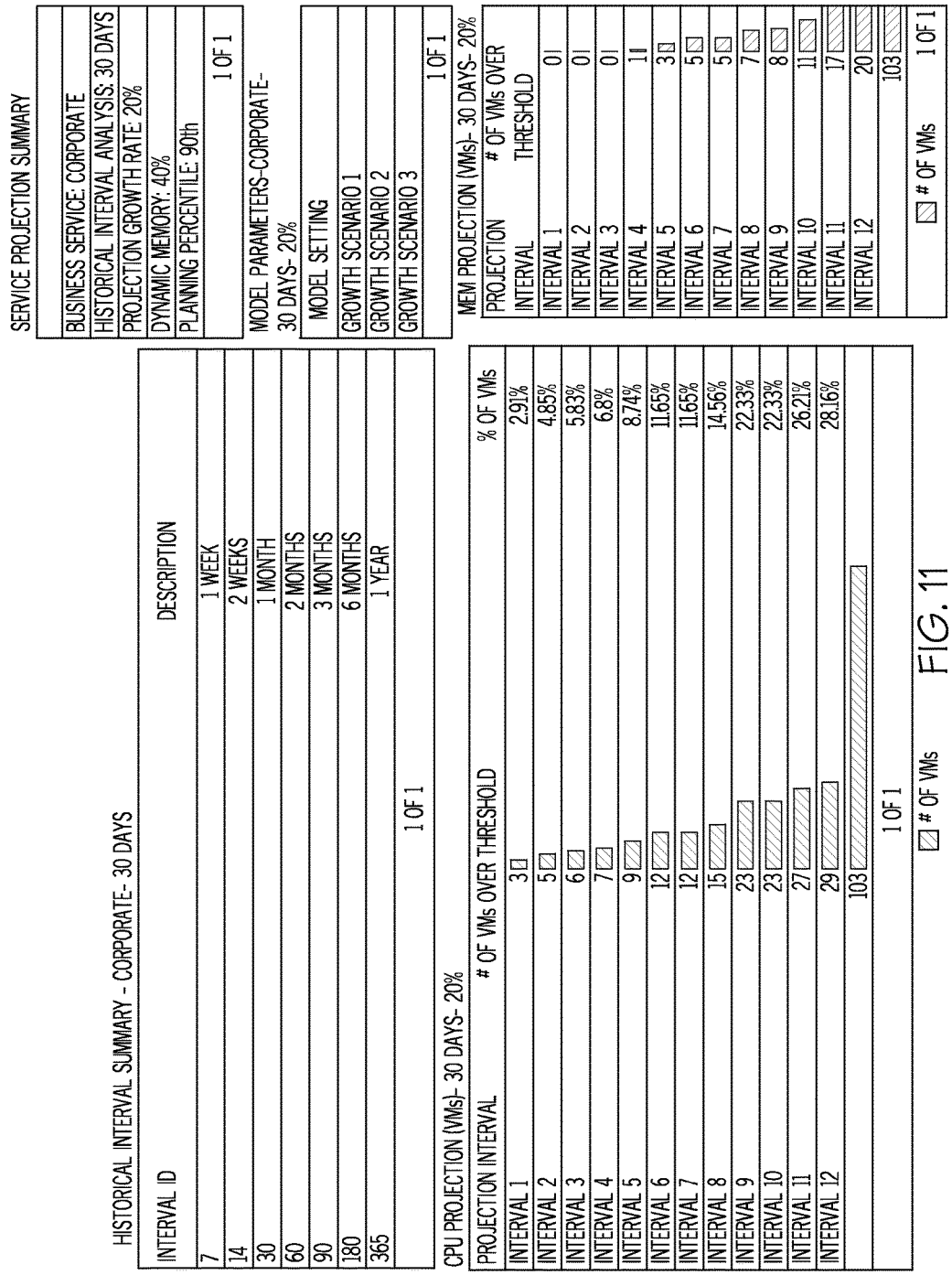
FIG. 11 illustrates an example user interface for a service projection summary that includes historical interval analysis, projection growth rates, and service forecast summary details in accordance with a non-limiting embodiment of the present disclosure.

FIGS. 11 and 12A-D illustrate various user interface reports that may be generated by the capacity consumption and utilization modeling systems of the present disclosure. FIG. 11 shows projection analysis results over a series of projection intervals. For example, a user may select a historical interval for collecting baseline capacity consumption and utilization data for a particular resource as well as forecast intervals for applying forecast thresholds to projected data. The user interface report of FIG. 11 shows a total count of resources determined to deviate from the forecast threshold at each interval.

FIGS. 12A-D each illustrates various projection reports for various resource types. The reports illustrate the current state of the resource, the interval during which the resource breached the forecast threshold, and a listing of utilization levels at each forecast interval.

Certain legacy systems may not assist user selection of servers for virtual placement management operations, such as virtual resource consolidation, or capacity management modeling processes. Additionally, users have only a discrete amount of servers that they can select from to simulate and/or model capacity planning and consolidation scenarios due to the high cost of manual configuration of modeling operations.

In certain embodiments, performance metric data points for processes or applications in large scale IT infrastructure, such as a cloud environment, are compiled in a view. The view may be a materialized view created nightly. Traditionally, system administrators may manually manage performance using these generated views. The teachings of the present disclosure may utilize this performance data and CML components corresponding to resources in an IT environment to generate capacity consumption models. These capacity consumption models may be based on historical data trends, but may be an excellent predictor of future capacity requirements. For example, using the above described example, capacity thresholds may be used along with slope detection capabilities to determine sizing recommendations for particular components in an IT environment.

In certain embodiments, sizing rules for virtual environments may be set using templates. For example, one organization may specify that only virtual machines having certain configurations (e.g., two processors with four GB of memory) are to be provisioned/used in the virtual environment. Virtual machine templates may specify these parameters as sizing guidelines. Thus, sizing recommendations may be made according to the virtual machine templates. For example, a virtual machine that requires more processing power may be re-sized to a virtual machine having the next highest processing capacity based on a virtual machine template specification.

In one example, virtual machine templates may be specified based on the operating system of the virtual machine. In this example, MICROSOFT WINDOWS™ templates include the following configurations: one processor with four GB of memory, one processor with eight GB of memory, two processors with four GB of memory, and two processors with eight GB of memory. LINUX™ templates include the following configurations: two processors with four GB of memory, two processors with six GB of memory, two processors with eight GB of memory, and eight processors with twelve GB of memory.

Accordingly, when an automatic resize operation of a virtual machine is performed, the system may account for virtual resource operating system and available sizing templates for sizing operations.

In one example, the system may generate weekly trend reports that notify stakeholders of usage trends in virtual environments. Exception reports may also be generated that specify which systems are outliers in terms of usage and/or performance. Allocation reports may detail how resources are being or should be allocated. Aggregate detail reports may contain details on multiple metrics and underlying resources. For example, metrics for a specific set of virtual machines and/or associated clusters may be determined and displayed in a report.

The teachings of the present disclosure may enable generation of a sizing report. The sizing report may contain performance data regarding processes in a virtualization environment, and may be automatically generated nightly, without user configuration.

Users may assign sizing rules for a given parameter. In certain embodiments, default or automatic sizing rules may be in place. The sizing rules may automatically right-size (e.g., up or down) virtual resources based on the next highest template resource if the slope of the metric that is the subject of the sizing rule indicates a trend in line with a provisioning strategy. For example, if CPU capacity consumption is declining and falls below a sizing rule threshold, the system may determine the slope and/or trend of the CPU consumption and my right-size the virtual resource down to the next CPU configuration down.

Users may modify sizing rule parameters as needed with a user interface. Thus, when the values in the sizing report increase above a certain level specified by either default or user-specified sizing rules, virtual resources may be automatically right-sized to respond accordingly.

Configuration of modern capacity modeling processes may be divided into certain sections. For example, one capacity modeling process may be divided into three distinct sections that may each have separate sub-sections and/or tasks associated with them. Each of these sections/tasks may be manual and may be required to model system capacity. Further, a user may be required to manually select which virtual machine/servers, out of numerous components across an enterprise virtualization environment, are to be included as part of the capacity modeling operation.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
receiving an expected growth rate for modeling future capacity utilization for a resource hosting a plurality of processes, each process being associated with a respective workload, wherein the resource is associated with a plurality of computing components, and wherein the plurality of processes comprise (1) system processes that do not experience increased workloads when demand for applications increases and (2) application specific processes;
modifying, in a non-linear capacity utilization model for the resource, the respective workload for a particular application specific process in the plurality of processes based on the expected growth rate, wherein the non-linear capacity utilization model (1) characterizes a capacity of the plurality of computing components associated with the resource to service additional workloads regardless of platform characteristics and (2) isolates the system processes from being affected by the modification to the respective workload for the particular application specific process;
in response to modifying the respective workload in the non-linear capacity utilization model for the resource, determining a predicted change in total capacity utilization for the resource in the non-linear capacity utilization model;
determining that the predicted change in total capacity utilization from the non-linear capacity utilization model exceeds an available capacity of the resource based on a ratio between the predicted change in the total capacity utilization for the resource and the modification to the respective workload; and
modifying, based on the ratio, a configuration of the resource with respect to the particular application specific process in anticipation of the expected growth rate.

2. The method of claim 1, further comprising:
determining a portion of an initial total capacity utilization attributable to the particular application specific process; and
in response to modifying the respective workload, determining a ratio between the predicted change in the total capacity utilization for the resource and the portion of the initial total capacity utilization attributable to the particular application specific process.

3. The method of claim 1, wherein the plurality of processes are divided into a first group, indicative of system-level processes, and a second group, indicative of application processes, and wherein the method further comprises:
determining a ratio between a first portion of an initial total capacity utilization attributable to the first group of processes and a second portion of the initial total capacity utilization attributable to the second group of processes.

4. The method of claim 1, wherein the resource is a virtual resource, and wherein modifying the configuration of the resource comprises modifying virtual components of the virtual resource.

5. The method of claim 1, wherein modifying the configuration of the resource comprises modifying a physical server infrastructure associated with the resource.

6. The method of claim 1, wherein the non-linear capacity utilization model is assembled from a set of models configured to emulate:
hardware components associated with the resource;
an operating system of the resource; and
virtual components associated with the resource.

7. The method of claim 1, wherein modifying the configuration of the resource with respect to the particular application specific process comprises consolidating virtual resources associated with the particular application specific process, wherein the growth rate is negative.

8. A computer configured to access a storage device, the computer comprising:
a processor; and
a non-transitory, computer-readable storage medium storing computer-readable instructions that when executed by the processor cause the computer to perform:
receiving an expected growth rate for modeling future capacity utilization for a resource hosting a plurality of processes, each process being associated with a respective workload, wherein the resource is associated with a plurality of computing components, and wherein the plurality of processes comprise (1) system processes that do not experience increased workloads when demand for applications increases and (2) application specific processes;
modifying, in a non-linear capacity utilization model for the resource, the respective workload for a particular application specific process in the plurality of processes based on the expected growth rate, wherein the non-linear capacity utilization model (1) characterizes a capacity of the plurality of computing components associated with the resource to service additional workloads regardless of platform characteristics and (2) isolates the system processes from being affected by the modification to the respective workload for the particular application specific process;

in response to modifying the respective workload in the non-linear capacity utilization model for the resource, determining a predicted change in total capacity utilization for the resource in the non-linear capacity utilization model;

determining that the predicted change in total capacity utilization from the non-linear capacity utilization model exceeds an available capacity of the resource based on a ratio between the predicted change in the total capacity utilization for the resource and the modification to the respective workload; and modifying, based on the ratio, a configuration of the resource with respect to the particular application specific process in anticipation of the expected growth rate.

9. The computer of claim 8, wherein the computer-readable instructions further cause the computer to perform:
determining a portion of an initial total capacity utilization attributable to the particular application specific process; and
in response to modifying the respective workload, determining a ratio between the predicted change in the total capacity utilization for the resource and the portion of the initial total capacity utilization attributable to the particular application specific process.

10. The computer of claim 8, wherein the plurality of processes are divided into a first group, indicative of system-level processes, and a second group, indicative of application processes, and wherein the computer-readable instructions further cause the computer to perform:
determining a ratio between a first portion of an initial total capacity utilization attributable to the first group of processes and a second portion of the initial total capacity utilization attributable to the second group of processes.

11. The computer of claim 8, wherein the resource is a virtual resource, and wherein modifying the configuration of the resource comprises modifying virtual components of the virtual resource.

12. The computer of claim 8, wherein modifying the configuration of the resource comprises modifying a physical server infrastructure associated with the resource.

13. The computer of claim 8, wherein the non-linear capacity utilization model is assembled from a set of models configured to emulate:
hardware components associated with the resource;
an operating system of the resource; and
virtual components associated with the resource.

14. The computer of claim 8, wherein modifying the configuration of the resource with respect to the particular application specific process comprises consolidating virtual resources associated with the particular application specific process, wherein the growth rate is negative.

15. A computer program product comprising:
a non-transitory computer-readable storage medium having computer-readable program code embodied therewith, the computer-readable program code comprising:
computer-readable program code configured to receive an expected growth rate for modeling future capacity utilization for a resource hosting a plurality of processes, each process being associated with a respective workload, wherein the resource is associated with a plurality of computing components, and wherein the plurality of processes comprise (1) system processes that do not experience increased workloads when demand for applications increases and (2) application specific processes;

computer-readable program code configured to modify, in a non-linear capacity utilization model for the resource, the respective workload for a particular application specific process in the plurality of processes based on the expected growth rate, wherein the non-linear capacity utilization model (1) characterizes a capacity of the plurality of computing components associated with the resource to service additional workloads regardless of platform characteristics and (2) isolates the system processes from being affected by the modification to the respective workload for the particular application specific process;

computer-readable program code configured to, in response to modifying the respective workload in the non-linear capacity utilization model for the resource, determine a predicted change in total capacity utilization for the resource in the non-linear capacity utilization model;

computer-readable program code configured to determine that the predicted change in total capacity utilization from the non-linear capacity utilization model exceeds an available capacity of the resource based on a ratio between the predicted change in the total capacity utilization for the resource and the modification to the respective workload; and computer-readable program code configured to modify, based on the ratio, a configuration of the resource with respect to the particular application specific process in anticipation of the expected growth rate.

16. The computer program product of claim 15, wherein the computer-readable program code further comprises:
computer-readable program code configured to determine a portion of an initial total capacity utilization attributable to the particular application specific process; and
computer-readable program code configured to, in response to modifying the respective workload, determine a ratio between the predicted change in the total capacity utilization for the resource and the portion of the initial total capacity utilization attributable to the particular application specific process.

17. The computer program product of claim 15, wherein the plurality of processes are divided into a first group, indicative of system-level processes, and a second group, indicative of application processes, and wherein the computer-readable program code further comprises:
computer-readable program code configured to determine a ratio between a first portion of an initial total capacity utilization attributable to the first group of processes and a second portion of the initial total capacity utilization attributable to the second group of processes.

18. The computer program product of claim 15, wherein the resource is a virtual resource, and wherein modifying the configuration of the resource comprises modifying virtual components of the virtual resource.

19. The computer program product of claim 15, wherein modifying the configuration of the resource comprises modifying a physical server infrastructure associated with the resource.

20. The computer program product of claim 15, wherein the non-linear capacity utilization model is assembled from a set of models configured to emulate:
hardware components associated with the resource;
an operating system of the resource; and
virtual components associated with the resource.

* * * * *